(12) United States Patent
Schmidt-Karaca et al.

(10) Patent No.: US 8,604,973 B2
(45) Date of Patent: Dec. 10, 2013

(54) DATA ACCESS AND MANAGEMENT USING GPS LOCATION DATA

(75) Inventors: Markus Schmidt-Karaca, Heidelberg (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 96 days.

(21) Appl. No.: 12/957,344

(22) Filed: Nov. 30, 2010

(65) Prior Publication Data

US 2012/0133553 A1 May 31, 2012

(51) Int. Cl.
*G01S 19/03* (2010.01)
(52) U.S. Cl.
USPC ........................................ 342/357.4
(58) Field of Classification Search
USPC ........................................ 342/357.4
See application file for complete search history.

(56) References Cited

U.S. PATENT DOCUMENTS 8,077,042 B2 * 12/2011 Peeters ...................... 340/572.1
2010/0313614 A1 * 12/2010 Rzepecki ........................ 70/233

* cited by examiner

*Primary Examiner* — Harry Liu
(74) *Attorney, Agent, or Firm* — Mintz Levin Cohn Ferris Glovsky and Popeo, P.C.

(57) ABSTRACT

Disclosed are methods, systems and products, including a method that includes maintaining a plurality of records associated with a plurality of objects, the plurality of records are configured to include global positioning system (GPS)-based data representative of locations of the plurality of objects. The method also includes accessing at least one of the plurality of records based, at least in part, on determined global position system-based data representative of location of at least one object associated with the at least one of the plurality of records.

13 Claims, 4 Drawing Sheets

DATA ACCESS AND MANAGEMENT USING GPS LOCATION DATA

BACKGROUND

The present disclosure relates to data access and management, and more particularly to data access and management using, at least in part, GPS-based data.

To process and manage objects using business applications, a database, maintaining data records/sets holding information about the objects, requires a key to identify these objects. A challenge for users is to map the objects to the key used in the database to ensure that the data the user retrieves and/or writes back to the database is associated with the correct object of interest. Typically, objects (e.g., real-life, or tangible, objects) can be labeled or may otherwise include identifying information to enable accessing the correct data record associated with the object of interest.

For example, one way to identify objects is by tagging them using a radio-frequency identity tag (RFID). In such situations, an RFID transmitter is attached to the real life objects, and a device (e.g., a mobile device) identifies the key of the RFID transmitter, which can then be associated to a data set/record in a database. To use RFID technology as a way of identifying objects requires that RFID transmitters be attached to the object, resulting in extra costs. Also, it may sometimes be undesirably or not possible to attach transmitters (or other types of tags) to the object. For example, attaching tags may make it difficult to subsequently locate the tags and read them using a reading device (especially if the reading device is large or bulky and cannot be easily situated to properly receive the data from the RFID transmitter/tag). Moreover, tags can wear off, and can also get removed accidentally or intentionally.

Another way to tag and identify objects is by labeling them with an identification number (which may be encoded as a barcode). In such situations, the labels have to be produced (often in advance) and they have to have an identification number that is consistent with the one used in the database. Furthermore, as with RFID tags, it may sometime be undesirable or not possible to have a label attached to a real life object. Labels can wear off, become unreadable, or can get removed accidentally or intentionally. When a label gets removed or the identification on it become unreadable, it becomes difficult to determine what information was previously associated with the label, and to reproduce a label with the correct identification information.

SUMMARY

This present disclosure describes methods, systems, apparatus, and products in which a user can use a GPS device (e.g., a GPS enabled mobile device) running a mobile application for retrieve, edit, create and write (back to the data repository) data about the real life object while the user is situated in spatial proximity to the object. GPS coordinates (or some value derived therefrom) determined by the GPS device are used as a key (primary or secondary key) to identify the real life object and access the corresponding record in a remote data repository (e.g., a remote database).

Described herein is a method for tagging objects (e.g., real life objects that may be immovable or have a fixed location like a shelf space) via the objects' GPS location data, thus eliminating the need to use identification information located on or in the object, or attached to the object (e.g., using labels, RFID tags, etc.) GPS coordinates (or other forms of GPS data derived from the GPS coordinates) are used as a key in a database that keeps data about the objects in question (e.g., tangible objects deployed over geographical areas). Data entry or retrieval is thus made possible by using, for example, GPS devices that simply have to be operated close to the objects. A GPS device (e.g., a smart phone that includes a GPS receiver) uses its geographical position to identify the object, and the corresponding data sets in the remote database. The data about the object can be retrieved or updated without requiring the user to identify the object (either by providing some object ID, object description, or otherwise).

In some embodiments, a geographic positioning system (GPS) enables a mobile device with a GPS receiver to determine its geographic position. Subsequently, the determined GPS coordinates can be normalized by mapping/transforming those coordinates to fixed location values associated with a cell of a mesh (e.g., a grid) corresponding to the geographical area where objects are deployed. In some embodiments, the mesh's spacing may be an adjustable parameter of the application that manages the real life objects. The mesh's cells dimensions (and thus the spacing between cells) may be optimized to the resolution of the GPS system and to a distance value that is based on the distances between any two objects (e.g., the average distance of objects that have to be distinguished, the shortest distance between any two objects, etc.)

Accordingly, in some implementations, a mobile application running on a mobile device determines its position via a GPS system. A determination is then made of a fixed location (e.g., the center) of a mesh cell in which the device, and thus the object in question, is located to determine location value(s) for the cell. Use of fixed cell location values as an access key is more immune to the effects of small variations of the position of the GPS device. The location value is transferred to the database to serve as a key to the data in the database storing the data about the object. The data about the object can thus be retrieved from the database and be transferred to the mobile device for use by the user of the device who is currently located near the object. The user can subsequently make use of the data by reviewing information about the object, editing the retrieved data (which can then be recorded back into the database), and/or creating new data about the object. When sending new or updated data back from the mobile application, the GPS location data (be it actual coordinates, normalized location values, etc.) is transferred back to the database to serve as a key (primary, secondary) for the identification of the data records/sets that are to be updated or created.

Thus, in one aspect, a method is disclosed. The method includes maintaining a plurality of records associated with a plurality of objects, the plurality of records are configured to include global positioning system (GPS)-based data representative of locations of the plurality of objects. The method also includes accessing at least one of the plurality of records based, at least in part, on determined global position system-based data representative of location of at least one object associated with the at least one of the plurality of records.

Embodiments of the method may include any of the features described in the present disclosure, including any one or more of the following features.

The method may further include placing a global positioning system receiver proximate the at least one object, determining global positioning system coordinates associated with the at least one object, and tagging a record, from the plurality of records, associated with the at least one object with global positioning system location data representative of location of the at least one object, the global positioning system location data being determined based on the determined global positioning system-coordinates.

Accessing the at least one of the plurality of records may include placing a global positioning system device proximate one of the at least one object, determining global positioning system coordinates associated with the one of the at least one object, and accessing one of the at least one of the plurality of records based, at least in part, on the determined global positioning system coordinates.

The global positioning system device may include a global positioning system-enabled mobile device.

Accessing one of the least one of the plurality of records based, at least in part, on the determined global positioning system coordinates may include mapping the determined global positioning system coordinates to a cell in a mesh comprising a plurality of cells, the cell in the mesh associated with cell location values representative of global positioning system coordinates of a center of the cell (or some other position within the cell), the cell location values included in the one of the at least one of the plurality of records, and accessing the one of the at least one of plurality of records when the determined global positioning system coordinates provided by the global positioning system device are within a particular distance value from the global positioning system coordinates of the center of the cell.

The particular distance value may be computed based on distances between any two of multiple objects that are to be mapped to the plurality of cells in the mesh. The particular distance value may be computed based on one of, for example, shortest distance of the distances between any two of the multiple objects, and/or average distance of the distances between any two of the multiple objects.

The method may further include periodically adjusting the particular distance value.

Accessing the at least one of the plurality of records may include determining global positioning system coordinates provided by a global positioning system device, identifying a record from the plurality of records corresponding to the determined global positioning system coordinates, and retrieving data of the identified record from the plurality of records corresponding to the determined global positioning system coordinates.

The method may further include processing the retrieved data, the processing including at least one of, for example, editing the retrieved data, and communicating the edited data to update the identified record, and presenting the retrieve data on an output device.

Accessing the at least one of the plurality of records may include receiving at a mobile device data regarding the at least one object proximate the mobile device, the mobile device including a global positioning system receiver, determining by the global positioning system receiver of the mobile device a global positioning system-based location, identifying a record from the plurality of records corresponding to the determined global positioning system-based location, recording at least some the data regarding the at least one object at the identified record, and tracking the at least one object to maintain an inventory.

In another aspect, a system is disclosed. The system includes at least one processing-based device, and at least one non-transitory memory storage device in communication with the at least one processor-based device. The at least one memory storage device stores a repository of records and computer instructions that, when executed on the at least one processor-based device, cause the processor-based device to maintain a plurality of records associated with a plurality of objects, the plurality of records are configured to include global positioning system-based data representative of locations of the plurality of objects. The computer instructions further cause the at least one processor-based device to access at least one of the plurality of records based, at least in part, on determined global positioning system-based data representative of location of at least one object associated with the at least one of the plurality of records.

Embodiments of the system may include any of the features described in the present disclosure, including any of the features described above in relation to the method.

In a further aspect, a computer program product is disclosed. The computer program product includes at least one non-transitory computer readable storage device storing computer instructions that, when executed on at least one processor-based device, cause the at least one processor-based device to perform operations including maintaining a plurality of records associated with a plurality of objects, the plurality of records are configured to include global positioning system-based data representative of locations of the plurality of objects, and accessing at least one of the plurality of records based, at least in part, on determined global positioning system-based data representative of location of at least one object associated with the at least one of the plurality of records.

Embodiments of the computer program product may include any of the features described in the present disclosure, including any of the features described above in relation to the method and system.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Described herein are methods, system, apparatus and computer program products, including a method that includes maintaining a plurality of records associated with a plurality of objects, with the plurality of records configured to include global positioning system (GPS)-based data representative of locations of the plurality of objects. The method also includes accessing at least one of the plurality of records based, at least in part, on determined GPS-based data representative of location of at least one object associated with the at least one of the plurality of records. In some embodiments, the method further includes placing a GPS receiver proximate an object, determining GPS coordinates associated with the object, and tagging a record, from the plurality of records, associated with the object with GPS location data representative of location of the object, the GPS location data determined based on the determined GPS-coordinates.

Figure 1:
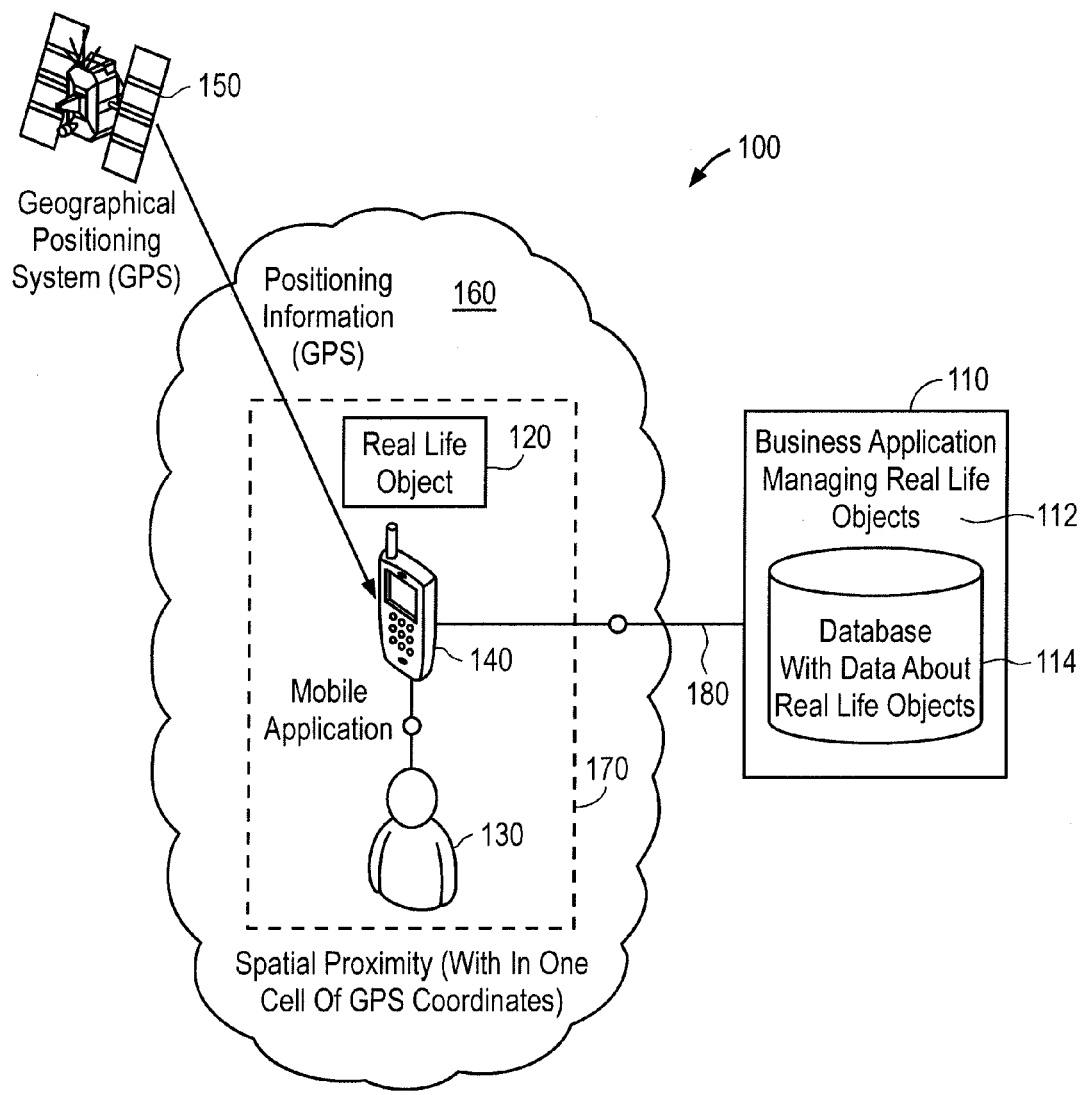
FIG. 1 is a schematic diagram of a system for managing information using GPS-based data.

With reference to FIG. 1, a schematic diagram of an example system 100 that manages information based, at least in part, on determined locations of objects, is shown. The system 100 includes a data repository, such as a database, 110 which may be implemented on one or more processor-based servers (which may be distributed). As shown, the database 110 includes a data management application 112 (which may be executing locally or remotely) and one or more data storage devices 114 (i.e., memory devices, which may also be distributed), in which data relating to the objects to be managed is maintained. The data management application 112 may be a commercial or customized data management system, e.g., a database management application implemented in software and executing on a processor-based servers. The database 110 may also include a communications module to enable it to communicate with remote devices (e.g., wirelessly, through a network gateway connection, through communication links, such as USB links, etc.)

The database 110 maintains data records, recorded on the one or more storage devices 114, including a plurality of data records associated with tangible objects (e.g., various machined, devices, products, etc.) At least some of the plurality of records associated with, and/or relating to, the objects, are configured to include global positioning system (GPS)-based data. Thus, such records may include fields (or linked to memory locations) that hold GPS-based data used to access and control the records (e.g., access and control the data relating to an associated object). The database 110 is further configured to access records based, at least in part, on the GPS-based data that is representative of locations of objects associated with the records to be accessed.

Figure 2:
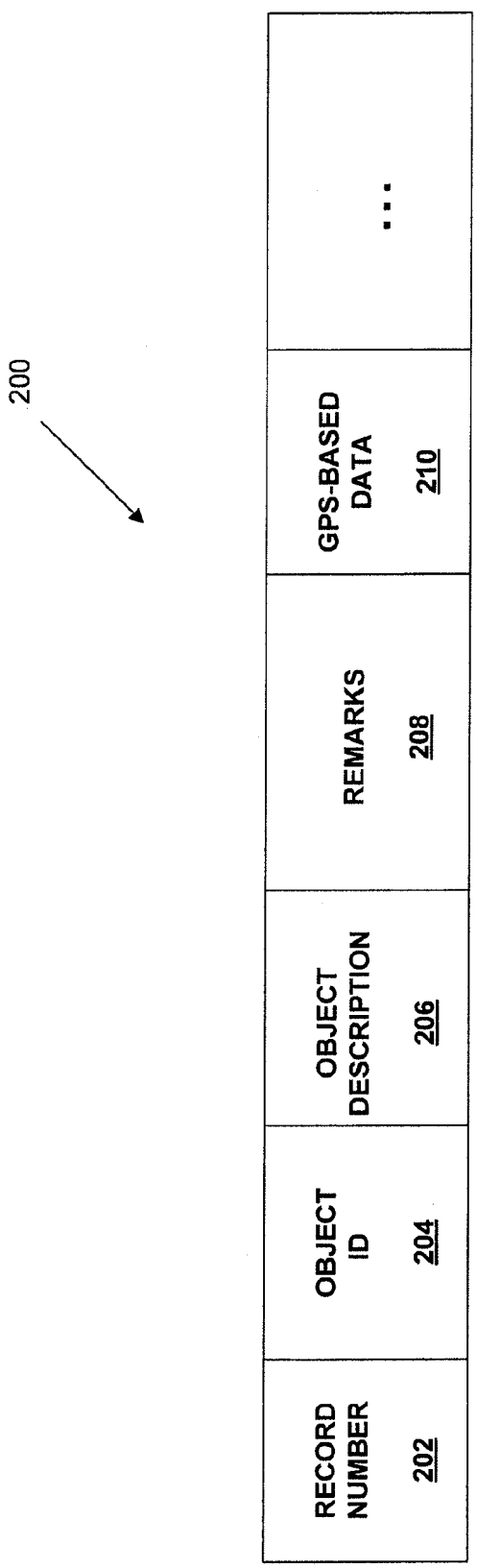
FIG. 2 is a schematic diagram of an example record associated with at least one object, and which includes GPS-based data.

With reference to FIG. 2 a schematic diagram of an example record 200, associated with at least one object, and which includes GPS-based data, is shown. The record 200 may, in some embodiments, include, for example, a record number field 202 storing a unique record number that can be used to uniquely identify that record. The record number may be used to access the record, and to otherwise manage the content of the record. The record 200 may further include an object ID field 204 to store data (e.g., an alphanumerical code) that may also be used to uniquely identify the object associated with the record 200. The object's ID may correspond to some identification system implemented to identify and manage the real-life objects for which records are maintained in the database 110. For example, real-life objects, deployed over some geographical area, may each be labeled or tagged with their corresponding object ID (which would match the IDs that are to be recorded, or are already recorded, in their associated records maintained in the database 110). The labels or tags of such objects may be encoded, for example, with bar codes corresponding to the objects' ID's, and can be read by a barcode reader (e.g., a laser scanner). The scanned code can be decoded to recover the Object ID 204, which is then used as a key to access (e.g., via a mobile device in communication with the database 110) the records of the database 110 and then retrieve data associated with the particular real object 120.

In some implementations, the record 200 may also include an object description field 206 providing information about the product, e.g., brand name, model, product specification, etc. These details included in the field 206 may be arranged as separate fields or as sub-fields of the field 206. Object description may also be used, in some embodiments, as an alternate key to access the records. Additionally, the record 200 may also include a Remarks field 208 used to record and maintain miscellaneous data relating to the record and/or the associated object. For example, this data field may be used to record various comments/observations made by a person (e.g., a technician) regarding the associated object, such as comments made while surveying the object (e.g., in the course of taking inventory of store merchandise).

As further shown in FIG. 2, another field that may be included in at least some of the records of the database 110 is a GPS-based data field 210 configured to store data representative of a location (e.g., physical/geographical) of the object associated with the record. The content of the field 210 may be obtained through a tagging procedure in which a GPS receiver is placed proximate the object associated with the record. The GPS coordinates of the GPS receiver (which would be the approximate coordinates of the object because the receiver would be located right next to the GPS receiver) can then be determined, for example, through conventional computation by the receiver of its GPS coordinates, based on signal received from GPS satellites. The appropriate record from the database can then be identified and accessed using, for example, one of the access keys for the record (e.g., the record number, the unique object ID, etc.) As used herein, "GPS" and "Global Positioning System" refer to any type of location system including systems based on satellite and/or terrestrial location techniques (e.g., Galileo, GPS-based location systems enhanced with cellular system location information, GPS-based location systems enhanced with terrestrially transmitted location information, indoor location based systems, and the like).

Once the correct record from the database is identified and accessed, that record is tagged by recording GPS-based data, representative of the GPS location determined using the GPS receiver, in the field 210. In some embodiments, the GPS-based data recorded may be the actual GPS coordinates determined by the GPS receiver. In some embodiments, the content of the field 210 may be a normalized value of the GPS coordinates. For example, the content of the field 210 may be the GPS coordinates of a cell in a grid or mesh in which the GPS device is located. In other words, the GPS coordinates determined by the GPS receiver may be mapped into a cell location value (which may be, for example, the GPS coordinates of the center of the cell), and that cell location value is what actually gets recorded in the GPS-based data field 210 of the record 200. The use of a pre-determined (e.g., fixed) cell location value instead of actual, exact GPS coordinates determined by the GPS receiver can allow for some margin of error in subsequently identifying, based on the cell location values derived from the GPS coordinates, a particular record. Particularly, it is unlikely the exact coordinates of the GPS device determined subsequent to the initial tagging of the record with GPS-based data would exactly match the tagged value, which could lead to difficulties in accurately and expeditiously accessing needed records.

In some embodiments, the GPS-based data may include mesh location data that uniquely identifies any cell within the mesh (e.g., by row and column where the mesh is configured as a grid including one or more real objects 120 being identified). Use of such mesh coordinate data can simplify the GPS-based data stored and can make more compact (and thus easier to manage and maintain).

As noted, the collection of cells can be thought of as forming a mesh, with the cells of the mesh having uniform or varying dimensions. The cells may also be constituted using one of various geometrical shapes, including circular shapes, square shapes, rectangular shapes, and/or may have some irregular geometrical configurations. As such, the mesh can have any configuration that can be divided into a plurality of cells (of various shapes and dimensions) that can each be uniquely identified and referenced by some referencing scheme (e.g., rows and columns, an ordered series of numbers, etc.)

In some implementations, the GPS-based data may be recorded manually by a user, or alternatively, the GPS coordinates determined by the GPS device may be automatically communicated to the database 110 for recordation in the appropriate record (with or without mapping/transformation of the GPS coordinates to other forms of data, such as grid coordinates). Recordation of GPS location data may occur, for example, during a tagging procedure, or when a record needs to be updated with new GPS location data if the associated object has been moved or if the mesh configuration has changed.

Once a record has been tagged with GPS-based data, data about the object(s) associated with the tagged record can be accessed using GPS location information. Thus, GPS location information for the object in question can be determined, and the appropriate record maintaining data relating to the object can be accessed, using the GPS location information as the key to retrieve and access the record.

In some embodiments, the records of database 110, such as the record 200 depicted in FIG. 2, may include additional fields and sub-fields not specifically shown in FIG. 2.

As noted, in some implementations, the logical organization of the record 200 need not be that of pre-defined fields, but may have other configurations. For example, the content of the record 200 may be stored in multiple memory locations in the storage area 114 of the database 110, and those multiple memory locations may be linked to each other in some manner (e.g., via pointers).

Turning back FIG. 1, as shown, the system 100 includes one or more real-life objects such as an object 120 deployed over a geographical area 160 (e.g., such geographical area may be a store/plant, a city, a county, a country, etc.). As noted, one way to access data from the database 110 is by using GPS location data as an access key. Thus, in some implementations, a user, such as a user 130 shown in FIG. 1, may place a GPS device 140 with a GPS receiver proximate to the object 120. In some embodiments, the GPS device may be any of various commercially available GPS devices (e.g., handheld GPS device), and may also include GPS enabled mobile devices, such as any of various commercially available smart phones that include GPS receivers. The GPS device is configured to receive satellite signals from one or more global positioning system satellites, such as the satellite 150, and based on the received satellite signals determine the GPS coordinates of the receiver (e.g., decode GPS information received from GPS satellites, determine the distances to each of the satellites whose signals were received, and use the determined distances to determine the GPS device's location through, for example, a trilateration procedure).

Because the GPS device 140 is placed proximate to the object 120, the GPS coordinates determined for the GPS device are considered to be the approximate GPS coordinates of the object 120. Accordingly, these GPS coordinates can be used to access the record corresponding to the object 120 by, for example, matching the determined GPS coordinates, or some value computed from it to a record from the database 110 whose GPS-based data (stored, for example, in a GPS-based data field such as the field 210 of the record 200) corresponds to the GPS coordinates.

To be able to access the correct record in the database 110 using GPS location data, such data should uniquely identify the record in question. Thus, the GPS coordinates determined by the GPS device placed proximate to a particular object would be associated, in some embodiments, only with that object. However, in some implementations, GPS coordinates may be associated with more than one object.

As noted above, using the actual GPS coordinates determined by the GPS device may be lead to frequent errors because successive GPS computations near a particular object may result in small variations of the determined GPS coordinates because, for example, the GPS device will usually not be located at exactly the same location near the object as it was when the object and associated record were tagged. Accordingly, in some implementations, GPS coordinates measured by the GPS device 140 may be converted, through a mapping or transformation procedure to a resultant location data (e.g., a mesh value, the center of the cell, etc.) associated with the particular object (in this case, the object 120). For example, the GPS coordinates can be mapped to one of multiple cells of a mesh corresponding to the particular geographical area in which the real life objects are located. As shown in FIG. 1, the GPS coordinates of the device 140 may be mapped to a representative location value (or values) for a cell 170 in which the GPS device 140 is determined to be. The cell 170 encompasses an area that includes the real life object 120, and does not include any other object. Thus, the GPS coordinates measured by the GPS device 140 anywhere within the cell 170 will be mapped to a single (usually pre-determined) location value(s) representative of the cell's location, and because only one object is located within the cell 170, the cell's location value can uniquely identify the object 120. Accordingly, the object 120 and its corresponding record in the database 110 can be tagged with the cell's location value, and that location value may be used to subsequently access the record.

In some embodiments, a cell's location values may be the cell's GPS coordinates at a center of the cell, although other points/positions within the cell may be used instead to represent the location of the cell. To access the record corresponding to the object 120, the GPS coordinates of the device 140 are computed, and a determination is made of which cell the device 140 is located in. For example, in some embodiments, a determined is made as to whether the computed GPS coordinates are within a particular distance value from the center of the cell 170. If the GPS coordinates indicate that the device 140 is within that distance value from the center of the cell 170, the GPS coordinates are deemed to be within the cell, and the location value of the center of the cell is thereafter used as the access key to access the record associated with the object 120. If the distance between the GPS coordinates of the GPS device 140 and the center of the cell 170 exceeds the particular distance value, the GPS device may be deemed to be outside the cell (and thus the GPS coordinate would be considered to be not those associated with the object 120). Under those circumstances, further determinations may be made to see if the GPS coordinates of the device 140 can be mapped into one of the cells adjacent to the cell 170. If they cannot be mapped into one of the other cells, this may be indicative that the determined GPS coordinates of the device 140 are too imprecise or ambiguous to be associated with any one object, and therefore a new GPS measurement, taken more closely to the object with respect to which data is required to be accessed, may be needed.

The particular distance value, used to determine if the GPS coordinates of the GPS device place it within a particular cell, may be based on distances between any two of multiple objects deployed in the geographical area corresponding to the mesh. For example, in some embodiments, the distance value used may be based on the shortest distance between any two of the multiple objects deployed in the geographic area. Basing the distance value on the shortest distance between any two object will enable establishing a cell resolution that, for example, would include no more than a one object within it. Thus, if the shortest distance between any two objects in the geographic area is used as the basis for the distance value used to determine if a GPS device is inside a particular cell, it should then be possible to use cells' location values to uniquely identify objects, and to therefore uniquely identify and access the appropriate record from the database 110 associated with the object.

In some embodiments, the distance value may be computed based on other formulations, for example, based on the average distance of the distances between any two of the multiple objects deployed in the geographic area covered by the grid. In some embodiments, the distance value may be an adjustable parameter that may be adjusted at pre-determined time intervals, or in response to a request for adjustment of the distance value, to account for changes in the deployment of objects in the geographic areas, or for other reasons necessitating an adjustment to the distance value.

To retrieve and process data for a particular object such as the object 120, the user 130 places the GPS device 140 near the object 120. The GPS coordinates determined by the GPS device 140 are mapped to a location value associated with the cell in which the object 120 and the device 140 are located, and that cell location value is transmitted (e.g., via communication link 180, which may be a wireless communication link, wire-based network communication link, etc.) to the database 110, where it is used as an access key to access the record from the database 110 associated with the object 120. The data in the accessed record is retrieved and communicated (optionally after performing data formatting and processing) to, for example, the mobile device 140 (in FIG. 1, retrieved data from the accesses record is also sent via the communication link 180).

At the device 140, the retrieved data may be processed to, for example, edit the retrieved data, and communicate the edited data to update the record in the database 110. The data may be edited by having the user make edits (e.g., inputting data), or by using the mobile device to obtain relevant data (e.g., contacting remote servers using wireless communication links to obtain the data, scanning data using a scanning instrument, such as a barcode reader included in the device, etc.) Data processing at the device 140 may also include, for example, presenting the retrieved data at a display device of the GPS device 140 where the user 130 may view the data. Other processing operations may also be performed.

In some implementations, to add new data the user may collect data (e.g., via the GPS/mobile device 140) in relation to a particular object, and communicate the collected data to the database 110 to have that data included/recorded in a record associated with the object. In such implementations, the GPS device determines the current GPS coordinates, and uses (in some embodiments) those coordinates to determine the cell and/or cell location value in which the GPS device 140 is located. The data and GPS-based location data (be it the actual GPS coordinates, the cell's location values, etc.) are then communicated to the database 110. Using the GPS location data, a record from the plurality of records maintained by the database 110 is identified, for example, by matching the GPS-based location data to the GPS-based data stored in the records of the database 110. At least some of the data communicated to the database 110 can then be recorded in the record identified using the GPS-based location data. For example, if the user entered comments regarding the state of the object 120, those comments can be recorded in a remarks field (similar to the Remarks field 208 of the example record 200 of FIG. 2). Where the user wishes to create a new record, GPS location data and relevant data relating to the object in question are communicated to the database 110, whereupon the database 110 creates a new record that includes the GPS location data and the additional data sent by the user.

Figure 3:
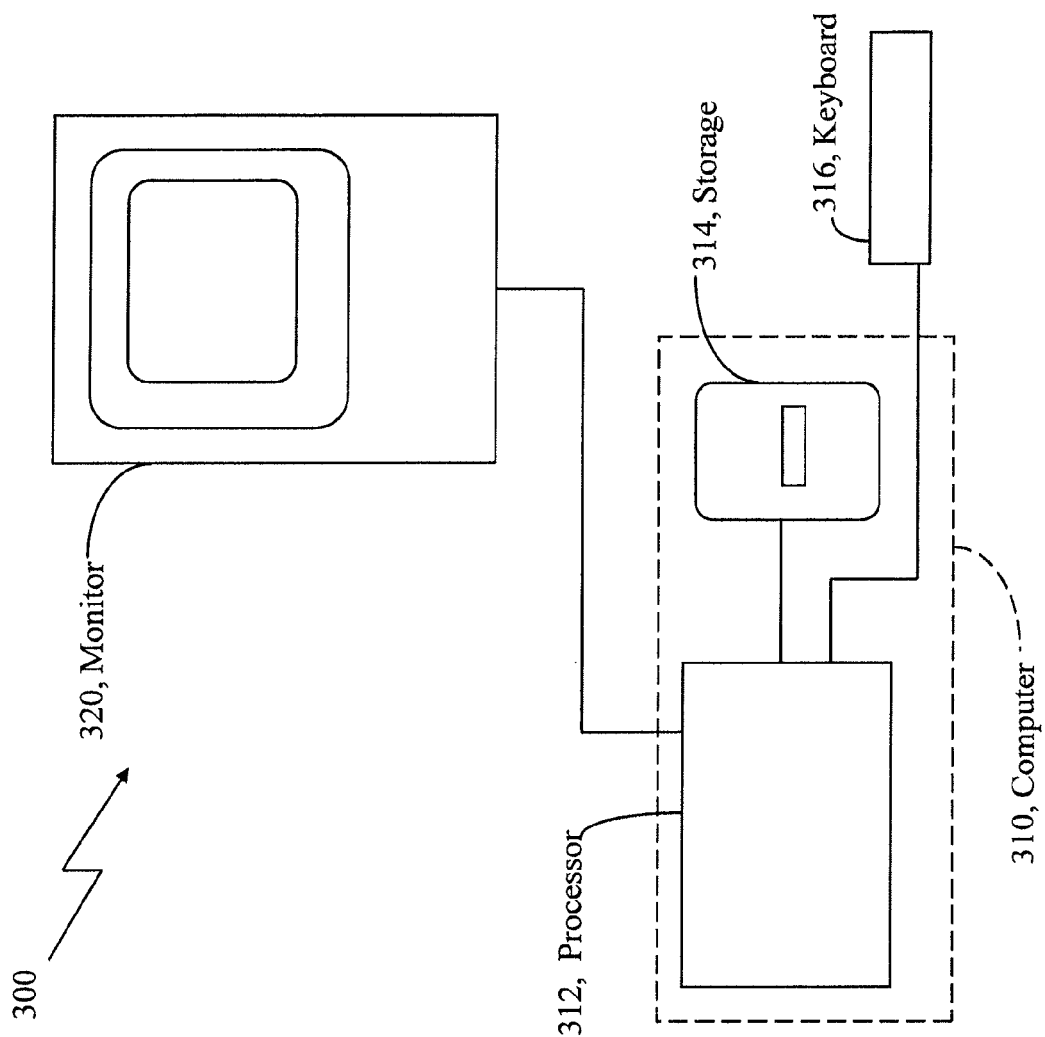
FIG. 3 is a schematic diagram of an example computing system that may be used in the implementation of any one of the various depicted components/units/devices of FIG. 1.

Each of the various components/units/devices depicted in FIG. 1 may be implemented using a processor-based computing device. Referring to FIG. 3, a schematic diagram of a computing system 300 that may be used in the implementation of any one of the various depicted components/units/device of FIG. 1 is shown. The computing system 300 includes a processor-based device 310 such as a wireless device, a personal computer; a personal digital assistant, a smart phone, a tablet computer, a specialized computing device, a reading machine, and so forth, that typically includes a central processor unit 312. In addition to the central processor unit 312, the system includes one or more of the following: main memory, cache memory, bus interface circuits, network interfaces (e.g., wireless and/ wired), and a location processor. The processor-based device 310 may also include a mass storage element 314. The computing system 300 may further include an input device, such as a keyboard 316, a display 320, e.g., a LCD (liquid crystal display) monitor.

The processor-based device 310 is configured to perform some or all of the operations described herein, including maintaining and accessing records in a repository (such as a database) using, at least in part, on GPS data. The storage device 314 may include computer program products that when executed on the processor-based device 310 cause at least some of the record maintenance and access operations described herein.

The processor-based device may further include peripheral devices to enable input/output functionality. Such peripheral devices include, for example, a DVD drive or a network connection, for downloading related content to the connected system. Such peripheral devices may also be used for downloading software containing computer instructions to enable general operation of the respective system/device, and for downloading software implemented programs to perform operations pertaining to the procedures and operations described herein. Alternatively and/or additionally, in some implementations, special purpose logic circuitry, e.g., an FPGA (field programmable gate array) or an ASIC (application-specific integrated circuit) may be used in the implementation of the system 300.

Other modules that may be included with the processor-based device 310 are speakers, a sound card, a pointing device, e.g., a mouse, a trackball, or a finger, by which the user can provide input to the computing system 300. Other kinds of devices can be used to provide for interaction with a user. For example, feedback provided to the user can be any form of sensory feedback, e.g., visual feedback, auditory feedback, or tactile feedback, and input from the user can be received in any form, including acoustic, speech, or tactile input. etc. (none of the additional modules are shown). The processor-based device 310 may include an operating system, e.g., Windows XP® Microsoft Corporation operating system, and/or the Android operating system). Alternatively, other operating systems could be used.

Figure 4:
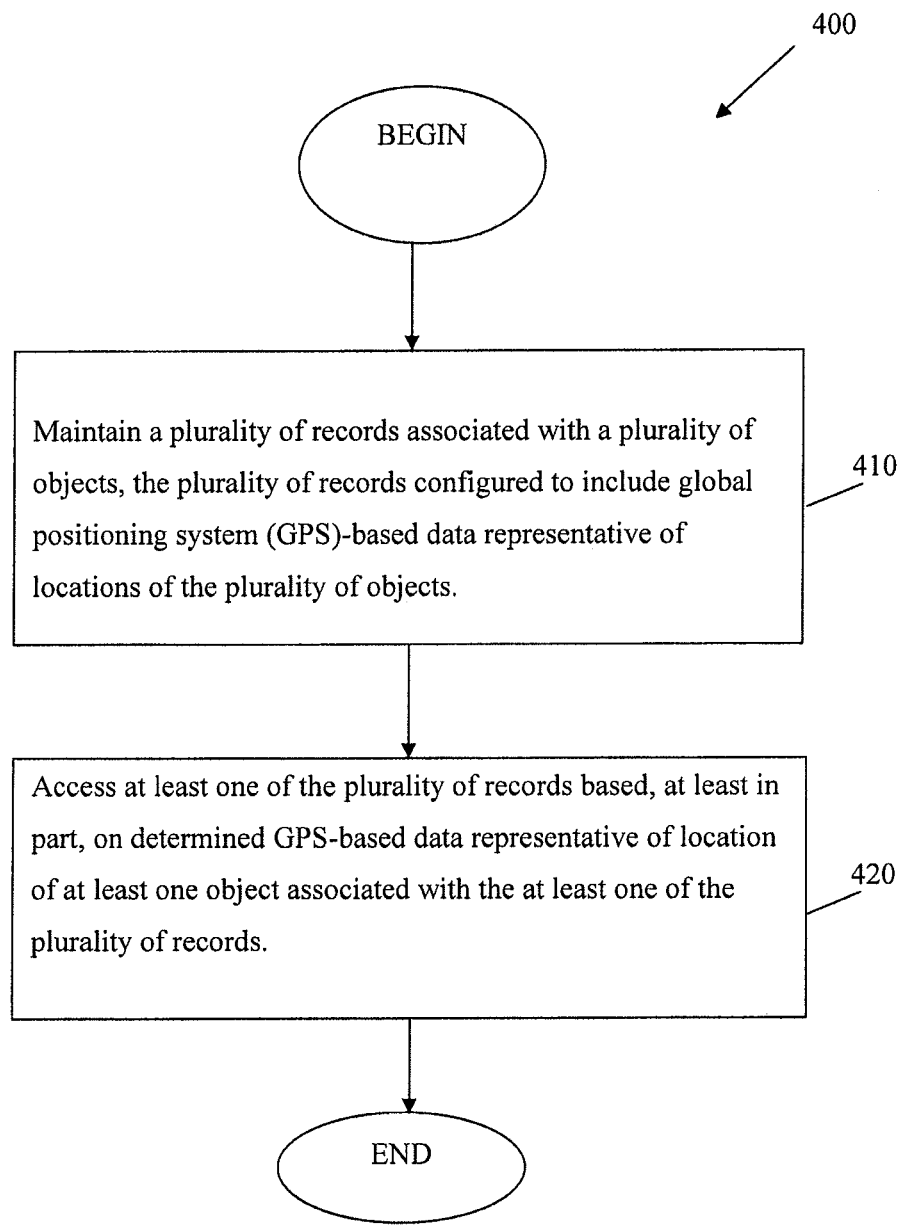
FIG. 4 is a flowchart of an example cloud-processing management procedure to access and manage data using GPS-based data.

FIG. 4 is a flowchart of an example procedure 400 to access and manage data using GPS-based data. As shown, data relating to objects (such as real life objects deployed in a geographical area) is maintained 410 in a data repository, such as the database 110 depicted in FIG. 1. The repository includes a plurality of records associated with a plurality of objects. The records are configured to include global positioning system (GPS)-based data representative of locations of the plurality of objects. In some embodiments, the GPS-based data may be actual GPS coordinates determined by a GPS device placed in proximity to the object associated with the records. In some embodiments, to avoid errors due to small variations in measured GPS coordinates for objects, determined GPS coordinates may be normalized(e.g., a mesh value, the center of the cell, etc.). For example, during an initial tagging procedure (e.g., a procedure in which an object and/or a record are "tagged" with an initial associated GPS location data that is then used as a access the record), measured GPS coordinates may be mapped into one of a plurality of cell areas constituting the geographical area where the object is deployed. Each such cell may be associated with a fixed location value, and it is those values (e.g., the mesh value, the GPS value of the center of a cell, etc.) that are used to tag objects and their associated records.

As further shown in FIG. 4, the procedure 400 also includes accessing 420 at least one of the plurality of records based, at least in part, on determined GPS-based data representative of location of at least one object associated with the at least one of the plurality of records. Thus, in some embodiments, to access a record, a GPS device may be placed near the object (s) whose associated record is to be accessed, and the GPS coordinates for that device are then determined. In some implementation, the determined GPS coordinates are normalized, e.g., mapping the coordinates into fixed cell location values corresponding to a cell of a "mesh" in which the object is located, and the mapped location values are then used as an access key to access the record in the database that is associated with the object in question.

The methods, systems, apparatus, and products described herein may be used in many different types of applications. The following are some examples of such applications, although the subject matter described herein may be used with other applications as well.

Maintenance Services: Service technicians visiting customers to provide maintenance or repair services to machines often have to cover a wide spectrum of machine types and models. For them it is important to get the right maintenance specifications, guides, bills of materials and technical drawings corresponding to the machine they are servicing. If the location of every machine at the customer site is associated with product information, the GPS data determined in a manner similar to that described in relation to FIGS. 1-4 is sufficient to pull up all details about the machine based on the GPS-based location information.

Inventory Taking: It is generally necessary to reconcile at regular intervals actual stock with the recorded stock. Often, this task requires a large workforce to determine inventory status. When handled manually in such a way, some stock may be forgotten while other stock may be counted multiple times, resulting in an incorrect inventory determination. However, by utilizing GPS-based data to assess inventory status, a stock-taking application can verify that all locations in the warehouse are covered exactly once. As a positive side benefit, all products can be associated with GPS-based location data that is recorded during the stock-taking operation, to thus enable such products to subsequently be quickly located and/or to retrieve related data.

Meetings: By associating GPS coordinates with meeting rooms, GPS devices, such as personal digital assistant (PDA) devices with GPS functionality, can determine if their associated users are in the correct meeting room as indicated by their calendars. If the current location does not match the room of the current meeting, a notification to that effect can be provided to the user.

Another application relating to meeting room reservation based on GPS location data is that of instant room reservation. If a person is looking for an available room and steps into an empty one, the GPS device can determine if the room is already booked by someone else who might be late, and may contact that person to check if the room has become available on short notice. If the room is free, the GPS device enables instant room booking.

The subject matter described herein can be implemented in digital electronic circuitry, in computer software, firmware, hardware, or in combinations of them. The subject matter described herein can be implemented as one or more computer program products, i.e., one or more computer programs tangibly embodied in non-transitory media, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server may arise by virtue of computer programs running on the respective computers and having a client-server relationship to each other.

A number of implementations of the invention have been described. Nevertheless, it will be understood that various modifications may be made without departing from the spirit and scope of the invention. Accordingly, other embodiments are within the scope of the following claims.

What is claimed:

1. A method comprising:
maintaining a plurality of records associated with a plurality of objects, the plurality of records configured to include global positioning system-based data representative of locations of the plurality of objects; and
accessing at least one of the plurality of records based, at least in part, on determined global positioning system-based data representative of a location of at least one object associated with the at least one of the plurality of records,
wherein the accessing at least one of the plurality of records comprises
placing a global positioning system device proximate to the at least one object,
determining global positioning system coordinates associated with the global positioning system device, and
accessing the at least one of the plurality of records based, at least in part, on the determined global positioning system coordinates associated with the global positioning system device by at least
mapping the determined global positioning system coordinates associated with the global positioning system device to a cell in a mesh comprising a plurality of cells, the cell in the mesh associated with cell location values representative of global positioning system coordinates of a center of the cell, the cell location values included in the at least one of the plurality of records, and
accessing the at least one of the plurality of records when the determined global positioning system coordinates associated with the global positioning system device are within a particular distance value from the global positioning system coordinates of the center of the cell.

2. The method of claim 1, further comprising:
tagging a record, from the plurality of records, associated with the at least one object with global positioning system location data representative of the location of the at least one object, the global positioning system location data determined based on the determined global positioning system coordinates.

3. The method of claim 1, wherein the global positioning system device comprises a global positioning system-enabled mobile device, and wherein at least one of the maintaining and the accessing is implemented by at least one processor.

4. The method of claim 1, wherein the particular distance value is computed based on distances between any two of the plurality of objects that are to be mapped to the plurality of cells in the mesh.

5. The method of claim 4, wherein the particular distance value is computed based on one of: a shortest distance of the distances between any two of the plurality of objects, and an average distance of the distances between any two of the plurality of objects.

6. The method of claim 1, further comprising:
periodically adjusting the particular distance value.

7. The method of claim 1, wherein the accessing at least one of the plurality of records comprises:
identifying a record from the plurality of records corresponding to the determined global positioning system coordinates; and
retrieving data of the identified record from the plurality of records corresponding to the determined global positioning system coordinates.

8. The method of claim 7, further comprising:
processing the retrieved data, the processing comprising at least one of:
editing the retrieved data, and communicating the edited data to update the identified record, and
presenting the retrieved data on an output device.

9. The method of claim 1, wherein the accessing at least one of the plurality of records comprises:
identifying a record from the plurality of records corresponding to the determined global positioning system coordinates;
recording the data regarding the at least one object at the identified record; and
tracking the at least one object to maintain an inventory.

10. A system comprising:
at least one processing-based device; and
at least one non-transitory memory storage device in communication with the at least one processor-based device, the at least one memory storage device storing a repository of records and computer instructions that, when executed on the at least one processor-based device, cause the processor-based device to perform operations comprising:
maintaining a plurality of records associated with a plurality of objects, the plurality of records configured to include global positioning system-based data representative of locations of the plurality of objects; and
accessing at least one of the plurality of records based, at least in part, on determined global positioning system-based data representative of a location of at least one object associated with the at least one of the plurality of records,
wherein the accessing at least one of the plurality of records comprises
placing a global positioning system device proximate to the at least one object,
determining global positioning system coordinates associated with the global positioning system device, and
accessing the at least one of the plurality of records based, at least in part, on the determined global positioning system coordinates associated with the global positioning system device by at least
mapping the determined global positioning system coordinates associated with the global positioning system device to a cell in a mesh comprising a plurality of cells, the cell in the mesh associated with cell location values representative of global positioning system coordinates of a center of the cell, the cell location values included in the at least one of the plurality of records, and
accessing the at least one of the plurality of records when the determined global positioning system coordinates associated with the global positioning system device are within a particular distance value from the global positioning system coordinates of the center of the cell.

11. The system of claim 10, wherein the accessing at least one of the plurality of records comprises:
- identifying a record from the plurality of records corresponding to the determined global positioning system coordinates;
- recording the data regarding the at least one object at the identified record; and
- tracking the at least one object to maintain an inventory.

12. A computer program product comprising at least one non-transitory computer readable storage device storing computer instructions that, when executed on at least one processor-based device, cause the at least one processor-based device to perform operations comprising:
- maintaining a plurality of records associated with a plurality of objects, the plurality of records configured to include global positioning system-based data representative of locations of the plurality of objects; and
- accessing at least one of the plurality of records based, at least in part, on determined global positioning system-based data representative of a location of at least one object associated with the at least one of the plurality of records,.
- wherein the accessing at least one of the plurality of records comprises
  - placing a global positioning system device proximate to the at least one object,
  - determining global positioning system coordinates associated with the global positioning system device, and
  - accessing the at least one of the plurality of records based, at least in part, on the determined global positioning system coordinates associated with the global positioning system device by at least
    - mapping the determined global positioning system coordinates associated with the global positioning system device to a cell in a mesh comprising a plurality of cells, the cell in the mesh associated with cell location values representative of global positioning system coordinates of a center of the cell, the cell location values included in the at least one of the plurality of records, and
    - accessing the at least one of the plurality of records when the determined global positioning system coordinates associated with the global positioning system device are within a particular distance value from the global positioning system coordinates of the center of the cell.

13. The computer program product of claim 12, wherein the accessing at least one of the plurality of records comprises:
- identifying a record from the plurality of records corresponding to the determined global positioning system coordinates;
- recording the data regarding the at least one object at the identified record; and
- tracking the at least one object to maintain an inventory.

* * * * *